US009285752B2

(12) United States Patent
Okuno et al.

(10) Patent No.: US 9,285,752 B2
(45) Date of Patent: Mar. 15, 2016

(54) DRIVING DEVICE FOR DRIVING ENDLESS METAL BELT AND IMAGE FORMING APPARATUS

(71) Applicant: KYOCERA Document Solutions Inc., Osaka-shi, Osaka (JP)

(72) Inventors: Yuta Okuno, Osaka (JP); Masahiro Ueno, Osaka (JP); Akihiro Yamaguchi, Osaka (JP)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 14/453,225

(22) Filed: Aug. 6, 2014

(65) Prior Publication Data

US 2015/0043942 A1   Feb. 12, 2015

(30) Foreign Application Priority Data

Aug. 8, 2013   (JP) ................. 2013-165177

(51) Int. Cl.
| F16H 57/00 | (2012.01) |
| F16H 55/36 | (2006.01) |
| G03G 15/00 | (2006.01) |
| F16H 7/02 | (2006.01) |
| F16G 1/20 | (2006.01) |

(52) U.S. Cl.
CPC ............. *G03G 15/757* (2013.01); *F16G 1/20* (2013.01); *F16H 7/02* (2013.01)

(58) Field of Classification Search
CPC ........... F16H 7/02; F16H 55/36; B66B 15/04; F16G 5/16; B65G 39/071
USPC ............................................ 474/166, 184, 92
See application file for complete search history.

(56) References Cited

U.S. PATENT DOCUMENTS

| 1,290,894 | A | * | 1/1919 | Bryan | F16H 55/36 198/840 |
| 2,274,512 | A | * | 2/1942 | Weimer | F16H 7/02 474/148 |
| 2,569,367 | A | * | 9/1951 | Bradner | C25D 1/04 204/212 |
| 2,808,730 | A | * | 10/1957 | Shank | B65G 39/02 29/895.22 |
| 2,920,494 | A | * | 1/1960 | Dodwell | F16G 5/16 474/148 |
| 2,966,065 | A | * | 12/1960 | Renner | B65G 39/071 193/37 |
| 3,288,338 | A | * | 11/1966 | Morrow | B65G 39/071 226/193 |
| 3,523,462 | A | * | 8/1970 | Beindorf | F16G 5/10 29/460 |
| 3,604,283 | A | * | 9/1971 | Van Doorne | F16G 1/26 474/265 |
| 3,719,098 | A | * | 3/1973 | Graves | B65G 23/06 474/153 |
| 3,851,535 | A | * | 12/1974 | Presentey | F16H 55/36 474/166 |
| 3,949,621 | A | * | 4/1976 | Beusink | F16G 5/16 29/235 |
| 4,553,951 | A | * | 11/1985 | Pavone | F16G 1/28 346/139 A |

(Continued)

FOREIGN PATENT DOCUMENTS

| JP | 2001-112138 | 4/2001 |
| JP | 2002-248522 | 9/2002 |

(Continued)

*Primary Examiner* — Henry Liu
(74) *Attorney, Agent, or Firm* — Gerald E. Hespos; Michael J. Porco; Matthew T. Hespos

(57) ABSTRACT

A driving device includes an endless metal belt having a strip shape, rotational members, and a polisher. The rotational members bear the metal belt to allow the metal belt to run circularly. The polisher is disposed so as to come in contact with the widthwise opposite end edges of the metal belt to thereby polish the opposite end edges of the metal belt in running.

8 Claims, 7 Drawing Sheets

(56) References Cited

U.S. PATENT DOCUMENTS

| | | | | |
|---|---|---|---|---|
| 4,991,784 | A * | 2/1991 | Schmid | B64G 9/00 242/390.3 |
| 4,995,855 | A * | 2/1991 | Hasebe | F16H 55/38 474/167 |
| 5,108,351 | A * | 4/1992 | Parsons | F16G 1/20 474/237 |
| 5,152,047 | A * | 10/1992 | Kojima | F16G 1/21 156/137 |
| 5,397,277 | A * | 3/1995 | Doring | F16H 7/023 474/148 |
| 5,411,444 | A * | 5/1995 | Nakamura | F16H 7/02 474/148 |
| 5,470,271 | A * | 11/1995 | Briggs | G03G 15/75 451/39 |
| 5,685,793 | A * | 11/1997 | Van Blaricom | F16G 5/00 474/33 |
| 5,728,252 | A * | 3/1998 | Kniazzeh | B32B 37/0053 100/176 |
| 5,870,924 | A * | 2/1999 | Fahimi | G11B 23/08757 360/130.21 |
| 6,041,476 | A * | 3/2000 | deNormand | E05D 13/1207 16/196 |
| 6,371,448 | B1 * | 4/2002 | De Angelis | B66B 7/06 254/374 |
| 6,401,871 | B2 * | 6/2002 | Baranda | B66B 7/06 187/251 |
| 6,416,433 | B1 * | 7/2002 | Linnenbrugger | F16H 9/125 474/242 |
| 6,419,208 | B1 * | 7/2002 | Baranda | B66B 15/04 254/390 |
| 6,488,123 | B2 * | 12/2002 | Pitts | B66B 19/02 187/251 |
| 7,168,279 | B2 * | 1/2007 | Nakajima | B21B 5/00 451/49 |
| 9,010,495 | B2 * | 4/2015 | Prasad | B66B 15/04 187/254 |
| 2004/0256180 | A1 * | 12/2004 | Eichhorn | B66B 15/04 187/254 |
| 2010/0236869 | A1 * | 9/2010 | Fargo | B66B 7/062 187/251 |
| 2011/0293329 | A1 * | 12/2011 | Konishi | G03G 15/757 399/167 |
| 2012/0051788 | A1 * | 3/2012 | Tsuji | G03G 15/757 399/167 |
| 2015/0233445 | A1 * | 8/2015 | Yamaguchi | F16G 1/20 474/167 |

FOREIGN PATENT DOCUMENTS

| | | |
|---|---|---|
| JP | 2003-343655 | 12/2003 |
| JP | 2005-282709 | 10/2005 |
| JP | 2006-305652 | 11/2006 |
| JP | 2010-078072 | 4/2010 |

* cited by examiner

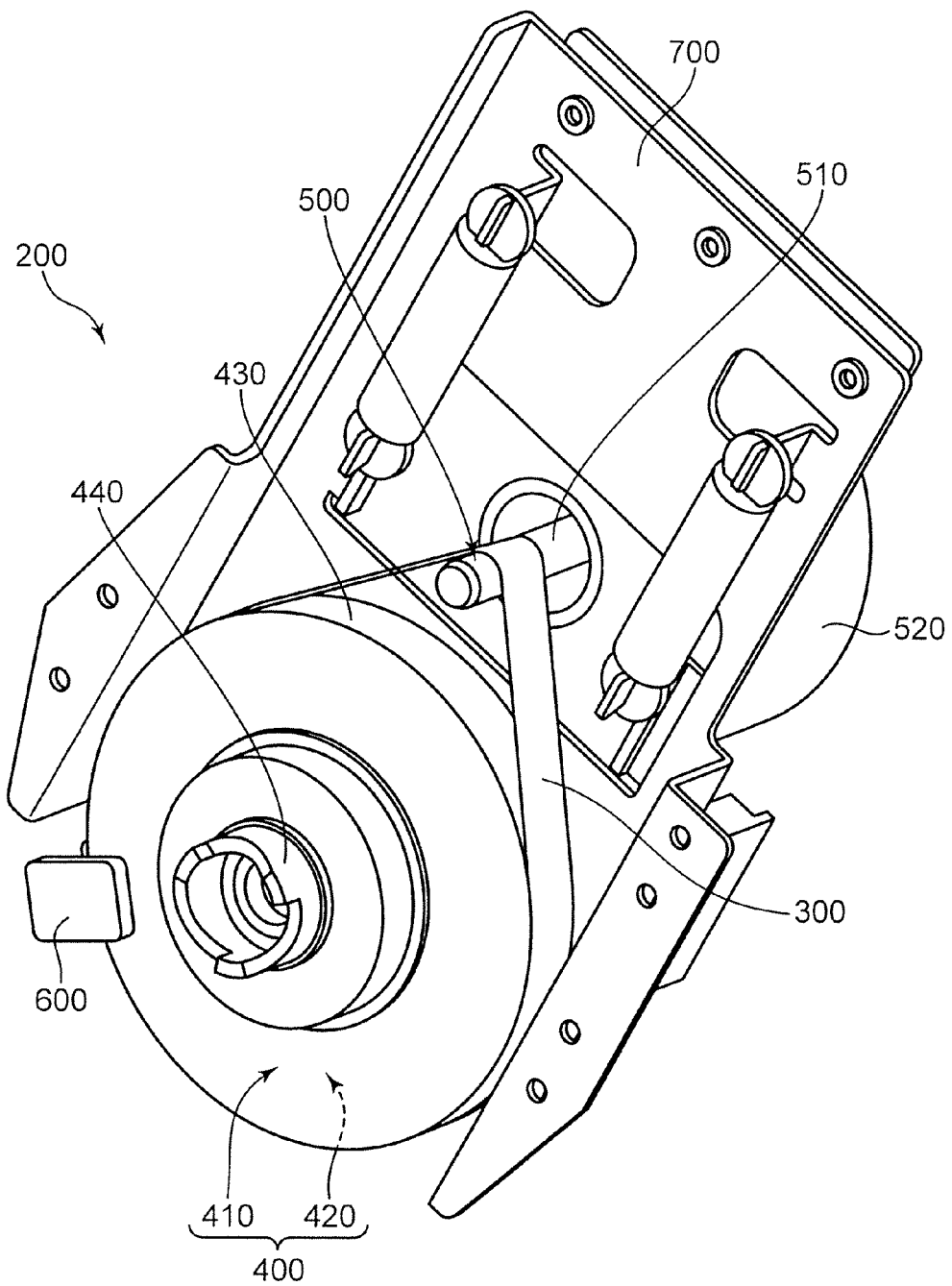

DRIVING DEVICE FOR DRIVING ENDLESS METAL BELT AND IMAGE FORMING APPARATUS

This application is based on Japanese Patent Application No. 2013-165177 filed with the Japan Patent Office on Aug. 8, 2013, the contents of which are hereby incorporated by reference.

BACKGROUND

The present disclosure relates to a driving device. More specifically, the present disclosure relates to a driving device employing a metal belt drive reducing method, and an image forming apparatus including the driving device.

Conventionally, an image forming apparatus uses a driving device to transmit power from a motor to a component such as photoconductive drum, thereby rotationally driving the component. An example of the photoconductive drum is an amorphous silicon photoconductive drum employing a drum rubbing system. For driving such photoconductive drum, there is required a driving device that is resistant to variation in rubbing load and excellent in rotational accuracy, in order to prevent jitter from occurring in an output image and to form an accurate color resist pattern.

However, widely used conventional gear mechanisms including resin gears are likely to cause banding and jitter in an output image due to a rigidity decrease, meshing vibration, or the like. In contrast, there is also known a driving device including a fraction drive which has a higher rigidity than the gear mechanism and which is free from biting. However, a driving device of this type requires a high cost, and is therefore unsuitable for developing a product having high cost competitiveness. Accordingly, as a driving device using no gears, a metal belt drive reducing method is considered to be used. The metal belt drive reducing method includes a metal driven belt wound around rotational members arranged on separate two axes.

SUMMARY

A driving device according to an aspect of the present disclosure includes an endless metal belt having a strip shape, rotational members, and a polisher.

The rotational members bear the metal belt to allow the metal belt to run circularly. The polisher is disposed so as to come in contact with the widthwise opposite end edges of the metal belt to thereby polish the opposite end edges of the metal belt in running.

An image forming apparatus according to another aspect of the present disclosure includes the above driving device, and an image former for forming an image on a sheet. The image former includes a component that is rotationally driven by the driving device.

These and other objects, features and advantages of the present disclosure will become more apparent upon reading the following detailed description along with the accompanying drawings.

BRIEF DESCRIPTION OF THE DRAWINGS

FIG. 2 is a perspective view of a driving apparatus according to an embodiment of the present disclosure.

DETAILED DESCRIPTION

First Embodiment

Figure 1:
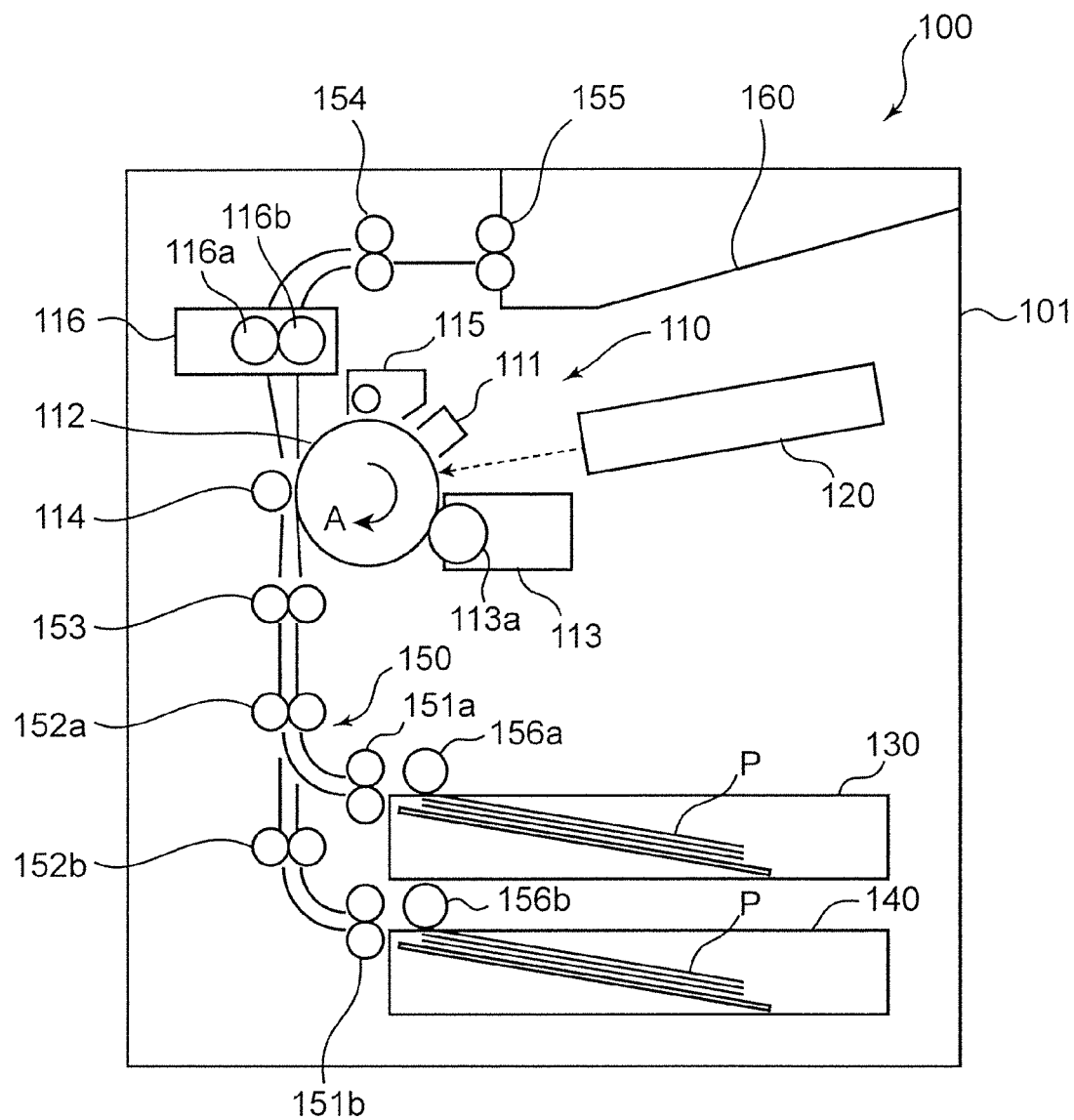
FIG. 1 is a schematic sectional view of a printer according to an embodiment of the present disclosure.

Hereinafter there will be described a printer (image forming apparatus) including a driving device according to the present disclosure. FIG. 1 is a schematic view of a printer 100 according to an embodiment of the present disclosure. The image forming apparatus is not limited to a printer, and may be a copying machine, a facsimile machine, a complex machine, and the like.

The printer 100 mainly includes a housing 101 having a box shape, and an image former 110, an optical scanning device 120, a sheet feeding cassette 130, and a sheet feeding cassette 140 disposed in the housing 101. The sheet feeding cassette 130 and the sheet feeding cassette 140 are detachably mounted in a lower part of the printer 100.

The image former 110 performs formation of a toner image on a sheet P, and mainly includes a charging device 111, a photoconductive drum 112, a developing device 113, a transferring roller 114, a cleaning device 115, and a fixing unit 116.

The photoconductive drum 112 is a cylindrical member, and has a circumferential surface on which an electrostatic latent image and a toner image are formed. The photoconductive drum 112 rotates in an arrow A direction by receiving a driving force from an unillustrated motor. The charging device 111 charges the circumferential surface of the photoconductive drum 112 substantially uniformly.

The developing device 113 supplies toner to the circumferential surface of the photoconductive drum 112 formed with an electrostatic latent image to form a toner image. The developing device 113 includes a developing roller 113a for carrying toner, and an unillustrated screw for agitating and conveying toner. The toner image formed on the photoconductive drum 112 is transferred onto a sheet P that has been fed out from the sheet feeding cassette 130 or the sheet feeding cassette 140 to be conveyed through a conveyance path 150. The developing device 113 is replenished with toner from an unillustrated toner container.

The transferring roller 114 is laterally opposed to the photoconductive drum 112, the transferring roller 114 and the photoconductive drum 112 forming a transfer nip portion. The transferring roller 114 is made of a rubber material or the like having conductivity, and applied with transfer bias to transfer the toner image formed on the photoconductive drum 112 onto the sheet P. The cleaning device 115 cleans the circumferential surface of the photoconductive drum 112 after the toner image has been transferred therefrom.

The fixing unit 116 includes a fixing roller 116a having a built-in heater, and a pressurizing roller 116b opposed to the fixing roller 116a. The fixing unit 116 conveys the sheet P formed with the toner image while heating the sheet P by the fixing roller 116a, thereby fixing the toner image transferred onto the sheet P.

The optical scanning device 120 irradiates the circumferential surface of the photoconductive drum 112 that has been charged substantially uniformly by the charging device 111 with laser light to form an electrostatic latent image, the laser light corresponding to image data input by an external device such as personal computer.

The sheet feeding cassette 130 and the sheet feeding cassette 140 store a plurality of sheets P that are to be subjected to image formation. The conveyance path 150 for conveying sheets is provided between the sheet feeding cassettes 130 and 140 and the image former 110. A pair of sheet feeding rollers 151a, a pair of sheet feeding rollers 151b, a pair of conveying rollers 152a, a pair of conveying rollers 152b, and a pair of resistance rollers 153 are disposed on the conveyance path 150. In addition, on a downstream side of the fixing unit 116, there are disposed a pair of conveying rollers 154, and a pair of discharging rollers 155 for discharging a sheet P onto a discharge tray 160.

The driving device according to the present disclosure is used for, for example, a component that is rotationally driven in a metal belt drive reducing method, among the above-mentioned operative components of the printer 100. The components that are driven by the driving device are not limited to a particular component, but include the photoconductive drum 112, the developing roller 113a of the developing device 113, the transferring roller 114, the fixing roller 116a and the pressurizing roller 116b of the fixing unit 116, the pair of sheet feeding rollers 151a, the pair of sheet feeding rollers 151b, the pair of conveying rollers 152a, the pair of conveying rollers 152b, and the pair of resistance rollers 153 that are provided in the conveyance path 150, a pick-up roller 156 or a pick-up roller 157, and the like. The driving device will be described in detail below.

Image formation operations of the printer 100 will be now briefly described. First, the charging device 111 charges the circumferential surface of the photoconductive drum 112 substantially uniformly. The charged circumferential surface of the photoconductive drum 112 is exposed to laser light emitted from the optical scanning device 120 to form thereon an electrostatic latent image of an image that is to be formed on a sheet P. The developing device 113 supplies toner to the circumferential surface of the photoconductive drum 112 to thereby develop the electrostatic latent image into a toner image. On the other hand, the sheet P is fed out from the sheet feeding cassette 130 (or the sheet feeding cassette 140) to the conveyance path 150 by the pick-up roller 156a (or the pick-up roller 156b). The sheet P is then conveyed by the pair of sheet feeding rollers 151a (or the pair of sheet feeding rollers 151b) and the pair of conveying rollers 152a (or the pair of conveying rollers 152b). Thereafter, the sheet P is temporarily stopped by the pair of resistance rollers 153, and then conveyed to the transfer nip portion between the transferring roller 114 and the photoconductive drum 112 at a predetermined timing. The sheet P passes through the transfer nip portion where the toner image is transferred onto the sheet P. After this transfer operation, the sheet P is conveyed to the fixing unit 116 to fix the toner image on the sheet P. Thereafter, the sheet P is discharged onto the discharge tray 160 by the pair of conveying rollers 154 and the pair of discharging rollers 155.

Now a driving device 200 according to an embodiment of the present disclosure will be described. FIG. 2 is a perspective view of the driving device 200. The driving device 200 includes an endless metal belt 300, a pair of rotational members (a driven pulley 400 and a motor drive shaft 500 being an example of a plurality of rotational members) which bear the metal belt 300 to allow the metal belt 300 to run circularly, and a polisher 600 for polishing the metal belt 300. The driving device 200 rotationally drives a component included in the printer 100 in the metal belt drive reducing method. Hereinafter, elements of the driving device 200 which rotatably drives, as an example, the photoconductive drum 112 will be described.

Figure 3A:
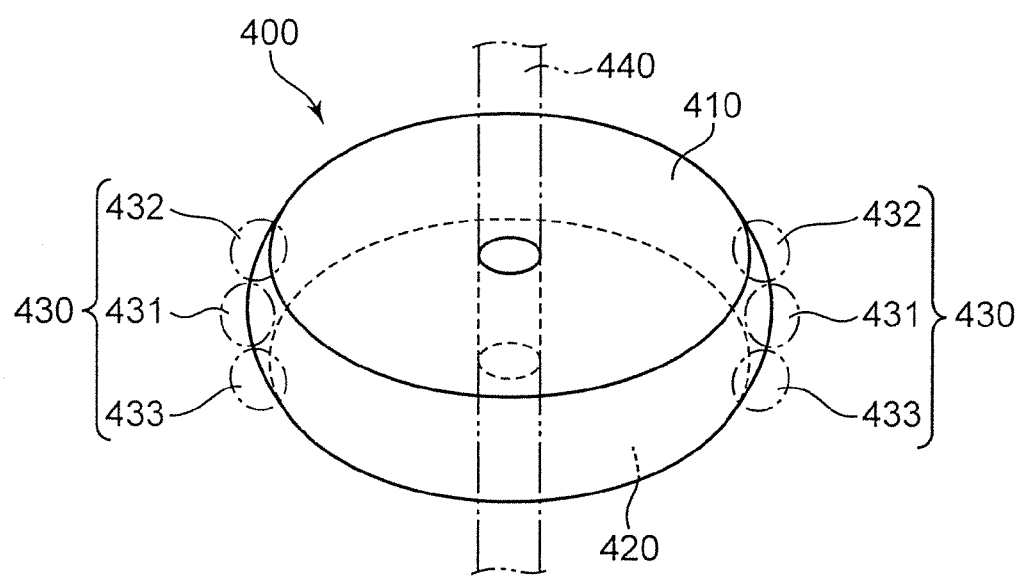
FIG. 3A is a schematic perspective view illustrating a shape of a driven pulley according to the first embodiment.
Figure 3B:
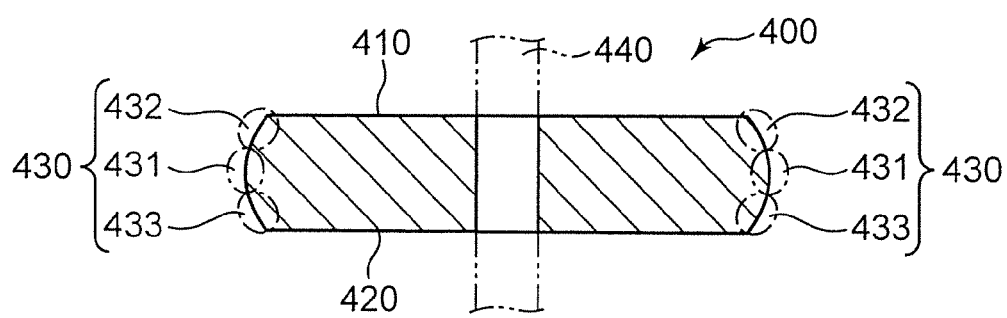
FIG. 3B is a diametrical sectional view of the driven pulley.

The pair of rotational members includes the driven pulley 400 and the motor drive shaft 500. FIG. 3A is a schematic perspective view illustrating a shape of the driven pulley 400, and FIG. 3B is a diametrical sectional view of the driven pulley 400.

The driven pulley 400 has a pair of surfaces including an upper surface 410 and a lower surface 420, and a circumferential surface 430 joining the peripheral edges of the upper surface 410 and the lower surface 420. The circumferential surface 430 has, in cross sectional view perpendicular to the radial direction, a convex shape (so-called crown shape) projecting radially outward (see FIG. 3B). The circumferential surface 430 bears the metal belt 300 thereon. More specifically, each of the upper surface 410 and the lower surface 420 is flat and circular, whereas the circumferential surface 430 is curved to bulge radially outward. The curve is formed by the circumferential surface 430 bulging in the radially outward direction, the bulge gradually reducing from a widthwise central region 431 of the circumferential surface 430 to the peripheral regions joining the upper surface 410 and the lower surface 420 (the peripheral regions hereinafter referred to as an upper peripheral region 432 and a lower peripheral region 433, respectively). The use of the terms "upper surface 410" and "lower surface 420" defined in the present embodiment is to determine directions for the convenience of clarifying the description, and therefore not intended to limit the installation direction of the driven pulley 400.

The bulged circumferential surface 430 of the driven pulley 400 makes contact with an inner peripheral surface of the metal belt 300 when the metal belt 300 is wound on the driven pulley 400 as described later. In this state, the circumferential surface 430 of the driven pulley 430 comes in contact with the inner peripheral surface of the metal belt 300 at the central region 431, and does not come in contact with the inner peripheral surface of the metal belt 300 at the upper peripheral region 432 and the lower peripheral region 433 (see FIG. 6 described later). The driven pulley 400 is fixedly attached to a first output shaft 440 which passes through the centers of the upper surface 410 and the lower surface 420 to extend vertically. The first output shaft 440 is connected to the photoconductive drum 112 (see FIG. 1). The driven pulley 400 rotates with the first output shaft 440.

Returning to FIG. 2, the motor drive shaft 500 is a substantially cylindrical shaft member and connected to an output shaft (unillustrated) of a motor 520. The motor drive shaft 500 bears the metal belt 300 on a circumferential surface 510 thereof. The motor drive shaft 500 is rotationally driven by the motor 520.

The relative positions of the driven pulley 400 and the motor drive shaft 500 are appropriately held by a holding member 700. The respective diameters of the driven pulley 400 and the motor drive shaft 500 are not limited to a particular value, and set appropriately to achieve a desired speed reduction ratio. Generally, the diameter of the driven pulley 400 is greater than that of the motor drive shaft 500. The diameter of the driven pulley 400 with respect to the diameter of the motor drive shaft 500 is set from 1:5 to 1:30 when, for example, they are used as a driving device for the photoconductive drum 112.

The metal belt 300 is an endless belt made of a metal strip. The use of such metal belt allows the driving device 200 to have a high rigidity and to suppress biting, as compared to the use of the conventional resin gears. The metal belt 300 is used by winding around the driven pulley 400 and the motor drive shaft 500 under a predetermined tension.

The metal belt 300 is straight between the rotational members, and in a curved form around the driven pulley 400 and the motor drive shaft 500 along those rotational members.

The perimeter of the metal belt 300 is not limited to a particular value and, therefore, can be selected from any perimeter of a metal belt that is typically used in usual driving devices. The perimeter ranges from 200 mm to 800 mm, for example. In addition, the width of the metal belt 300 is not limited to a particular value and, therefore, can be selected from any width of a metal belt that is typically used in usual driving devices. The width ranges from 5 to 10 mm, for example. Further, the thickness of the metal belt 300 is not limited to a particular value and, therefore, can be selected from any thickness of a metal belt that is typically used in usual driving devices. The thickness ranges from 0.1 to 2 μm, for example.

The metal belt 300 is not limited to a particular material, but preferably made of a nonmagnetic metal. The metal belt 300 made of a nonmagnetic metal is prevented from becoming rusty. Exemplary nonmagnetic metals include aluminum, copper, silver, and austenitic stainless steel. Above all, the nonmagnetic metal is preferably an austenitic stainless steel because of its high toughness.

Figure 4:
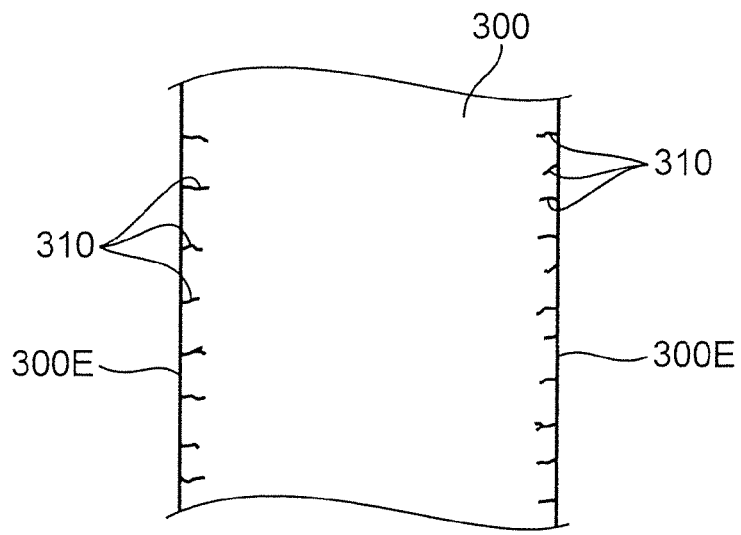
FIG. 4 is a schematic view illustrating damage occurring in a metal belt.

Here, damage (cracking) is liable to occur in the widthwise end edges of the metal belt 300 due to aging degradation or the like. FIG. 4 is a schematic view illustrating damage occurring in the end edges 300E of the metal belt 300. A great number of tiny cracks 310 occur in the widthwise end edges 300E of the metal belt 300. If the metal belt 300 continues to be used with the cracks 310 formed thereon, the cracks 310 grow in the width direction to cause the metal belt 300 to break. In the present embodiment, the polisher 600 described later is used to polish the end edges 300E of the metal belt 300. Even if such cracks 310 occur in the end edges 300E, the cracks 310 are polished and removed before growing by the polisher 600.

Figure 5:
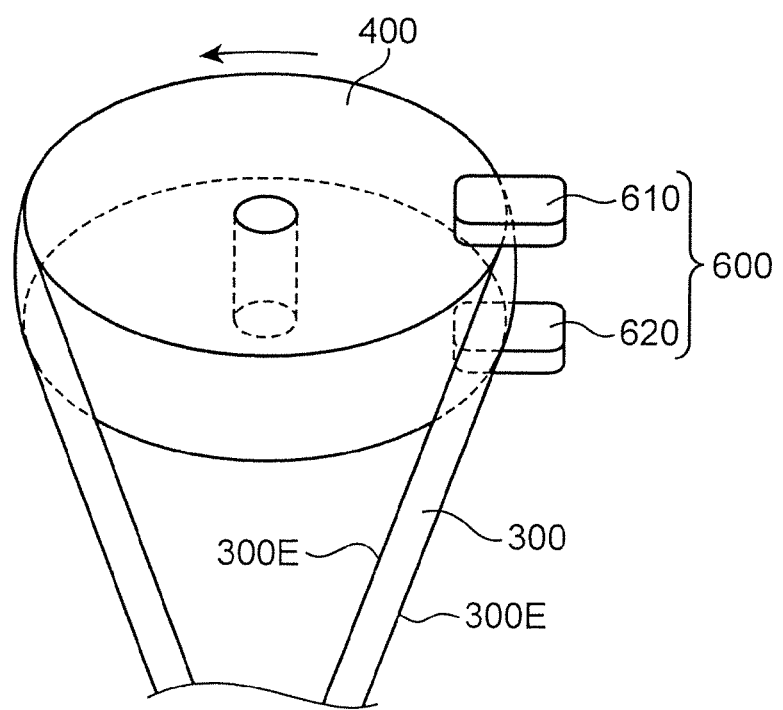
FIG. 5 is a schematic view illustrating an arrangement of a polisher.
Figure 6:
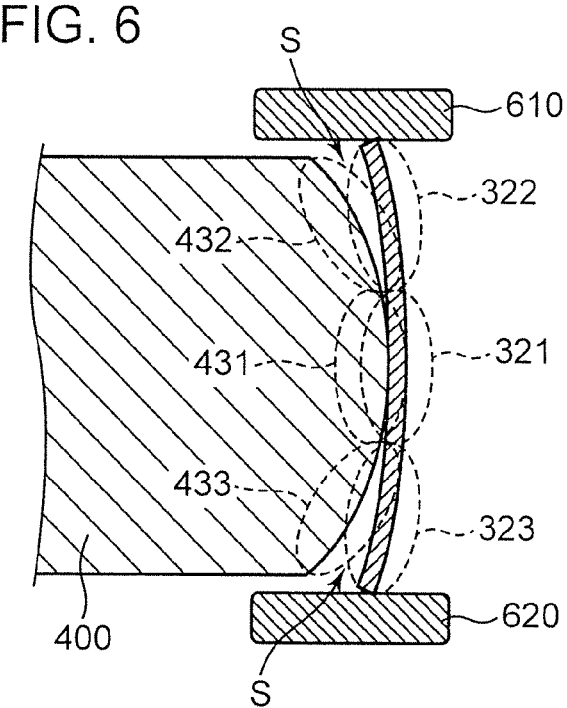
FIG. 6 is a schematic sectional view illustrating a state of contact between the metal belt and the polisher.

The polisher 600 polishes the end edges 300E of the metal belt 300. FIG. 5 is a schematic view illustrating an arrangement of the polisher 600. FIG. 6 is a schematic sectional view illustrating a state of contact between the metal belt 300 and the polisher 600. In the present embodiment, the polisher 600 is disposed on the end edges of the metal belt 300 in a curved form around the driven pulley 400 (the polisher being disposed on the opposite end edges 300E of a curved portion of the metal belt, the curved portion coming in contact with the rotational member). The polisher 600 includes a first polishing part 610 for polishing one of the opposite end edges 300E of the metal belt 300, and a second polishing part 620 for polishing the other of the opposite end edges 300E.

The circumferential surface of the driven pulley 400 bulges radially outward with the central region 431 extending farthest. The metal belt 300, as described above, has a curved form around the driven pulley 400 along the shape of the driven pulley 400. As shown in FIG. 6, the metal belt 300 wound on the driven pulley 400 comes in contact with the central region 431 of the driven pulley 400 at a widthwise central region 321 of the metal belt 300, and does not come in contact with the peripheral regions (the upper peripheral region 432 and the lower peripheral region 433) of the driven pulley 400 at respective corresponding widthwise peripheral regions (an upper peripheral region 322 and a lower peripheral region 323) of the metal belt 300. Therefore, spaces S are defined between the upper peripheral region 322 and the upper peripheral region 432 and between the lower peripheral region 323 and the lower peripheral region 433.

In the present embodiment, the opposite end edges of the metal belt 300 do not come in contact with the circumferential surface of the pulley 400, as described. This allows the first polishing part 610 and the second polishing part 620 of the polisher 600 to easily approach the upper peripheral region 322 and the lower peripheral region 323 of the metal belt 300, respectively. Consequently, the opposite end edges of the metal belt 300 are polished properly. In addition, because the upper peripheral region 322 and the lower peripheral region 323 of the metal belt 300 do not come in contact with the upper peripheral region 432 and the lower peripheral region 433 of the driven pulley 400, a stress from the driven pulley 400 is prevented from being applied to the opposite end edges of the metal belt 300. Therefore, cracks are unlikely to occur in the end edges of the metal belt 300.

Generally, the metal belt 300 is more likely to develop cracks 310 (see FIG. 4) in the end edges 300E when approaching the circumference of the driven pulley 400 or the motor drive shaft 500 and deforming from the straight form to the curved form, than when running between the driven pulley 400 and the motor drive shaft 500 in the straight form. In the present embodiment, the polisher 600 is disposed on the opposite end edges of the curved metal belt 300 near the driven pulley 400, in other words, on a further downstream position in the rotation direction of the driven pulley 400 than a position where the metal belt 300 starts changing from the straight form into the curved form. This allows the polisher 600, even when the metal belt 300 has cracks 310 in the end edges as a result of deformation from the straight form to the curved form, to polish the end edges including the cracks 310 immediately, thereby removing the cracks 310. Consequently, the cracks 310 are unlikely to grow, which in turn makes the metal belt 300 unlikely to break.

The polisher 600 may be disposed so as to be in constant contact with, or slightly away from the opposite end edges of the metal belt 300. Specifically, the metal belt 300 has some elasticity and receives vibrations from the driven pulley 400 during running Therefore, the metal belt 300 runs between the driven pulley 400 and the motor drive shaft 500 while oscillatingly shifting in the width directions. The polisher 600 only needs to be disposed so as to properly come in contact with the opposite end edges of the metal belt 300 in running while oscillatingly shifting as described above. In the case where the polisher 600 is disposed apart from the end edges of the metal belt 300, the distance of separation ranges from 0.5 to 2 mm, for example. If the polisher is disposed at a distance of separation within the above range, the metal belt 300 oscillatingly shifts in the width directions during running to come in contact with the polisher 600. This allows cracks 310 occurring in the end edges of the metal belt 300 to be properly polished and removed. Further, in the case of the distance within the above range, the end edges of the metal belt 300 is not in constant contact with the polisher 600, which prevents the end edges from being excessively polished and decreasing in strength.

The shape of the polisher 600 is not limited to a particular one, and may include any shape that avoids interference with a member constituting the driving device 200 (such as the driven pulley 400, the motor drive shaft 500, and the holding member 700). The present embodiment uses, as an example, the polisher 600 including the first polishing part 610 and the second polishing part 620 having a substantially rectangular shape as shown in FIG. 2.

Further, the polisher 600 only requires that a portion that makes contact with the end edge of the metal belt 300 be made of a material capable of polishing the metal belt 300 and, therefore, the material constituting the other portion of the polisher 600 is not limited to a particular one. Specifically, the entirety of the first and second polishing parts 610 and 620 may be made of a harder material than the metal belt 300. Alternatively, only the portion that makes contact with the peripheral edge of the metal belt 300 may be made of such hard material, whereas the other portion may be made of a material easy to be processed. Exemplary hard materials include materials having a hardness of 187 HB or more, specifically, SUS440C (stainless steel), G-STAR (pre-hardened steel manufactured by Daido Steel Co., Ltd.), SKS93 (tool steel), and S55C (carbon steel).

The above-described embodiment allows the polisher 600 to polish the opposite end edges of the metal belt 300 while the metal belt 300 is running between the driven pulley 400 and the motor drive shaft 500 for transmitting power. If cracks 310 occur in the end edges 300E of the metal belt 300, the cracks 310 are polished and removed before growing by the polisher 600. Therefore, the metal belt 300 does not require a maintenance worker to stop the operation of the printer 100 to check whether cracks occur in the end edges of the metal belt 300, or to work for removing the cracks if the cracks occur, for example. Further, because any cracks 310 are removed by polishing whenever they occur, the metal belt 300 is prevented from breaking Consequently, the driving device 200 is less likely to break and can be used for a long period of time.

Second Embodiment

A driving device 200 according to a second embodiment is configured in the same manner as the driving device 200 of the first embodiment, except that a driven pulley has a circumferential surface having a different shape. Accordingly, in the following description, the shape of the circumferential surface of the driven pulley will be described. Repeated description of sections and components that are identical to those of the first embodiment will be omitted as appropriate.

Figure 7:
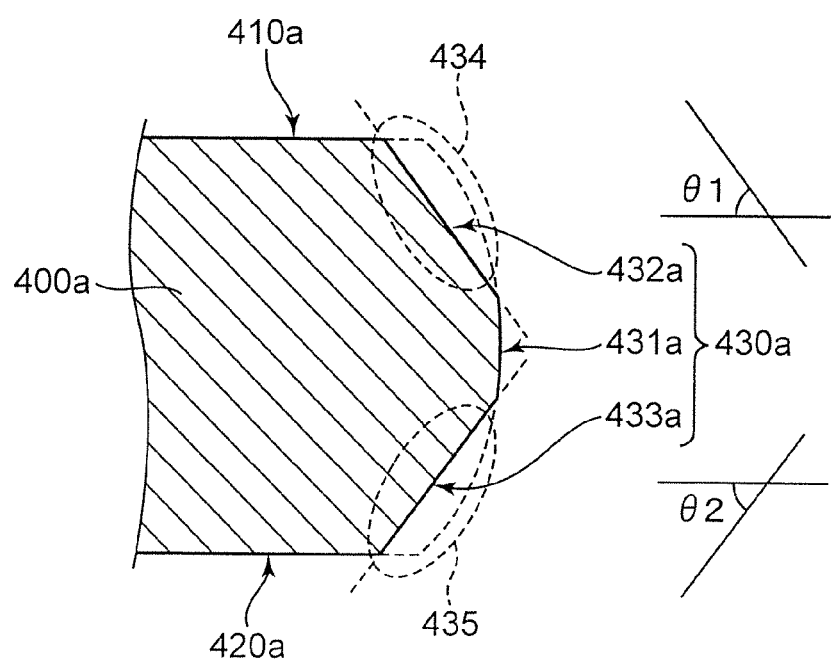
FIG. 7 is a diametrical sectional view of a driven pulley according to a second embodiment.

FIG. 7 is a diametrical sectional view of a driven pulley 400a according to the second embodiment. The driven pulley 400a has a circumferential surface 430a including a widthwise central region 431a, the central region coming in contact with a metal belt (unillustrated), and peripheral regions (an upper peripheral region 432a and a lower peripheral region 433a) having been processed by chamfering. The metal belt comes in contact with the central region 431a, but does not come in contact with the upper peripheral region 432a and the lower peripheral region 433a. Specifically, the driven pulley 400a includes an upper beveled area 434 formed by chamfering the upper peripheral region 432a joining an upper surface 410a, and a lower beveled area 435 formed by chamfering the lower peripheral region 433a joining a lower surface 420a (the beveled areas being obtained by chamfering the peripheral regions). The upper beveled area 434 and the lower beveled area 435 do not come in contact with the metal belt.

An angle of bevel is appropriately set on the basis of a physical property (such as degree of bending) of the metal belt, the width of the driven pulley 400a and the like. For example, as shown in FIG. 7, an angle θ1 of the upper beveled area 434 with respect to the upper surface 410a can be set in the range from 30 to 85 degrees. Similarly, an angle θ2 of the lower beveled area 435 with respect to the lower surface 420a can be set in the range from 30 to 85 degrees. The angle θ1 and the angle θ2 may be the same or may be different.

The driven pulley 400a having the beveled surface, when bearing the metal belt thereon, allows the central region 431a to easily come in contact with a belt widthwise central region on a radially inner surface of the metal belt, and prevents the upper peripheral region 432a and the lower peripheral region 433a from coming in contact with the metal belt. Therefore, a stress from the driven pulley 400a is easily applied to the central region 431a of the metal belt, but unlikely to be applied to the upper peripheral region region 432a and the lower peripheral region 433a of the metal belt. Consequently, the metal belt is unlikely to develop cracks in the peripheral regions, and therefore unlikely to break. In addition, the driven pulley 400a including the upper beveled area 434 and the lower beveled area 435 allows a polisher 600 (see FIG. 5) to easily approach the opposite end edges of the metal belt. Consequently, the end edges of the metal belt are properly polished.

Third Embodiment

A driving device according to a third embodiment is configured in the same manner as the driving device 200 of the first embodiment, except that a polisher is arranged in a different manner. Accordingly, repeated description of sections and components that are identical to those of the first embodiment will be omitted as appropriate. In the following, the arrangement of the polisher will be described.

Figure 8:
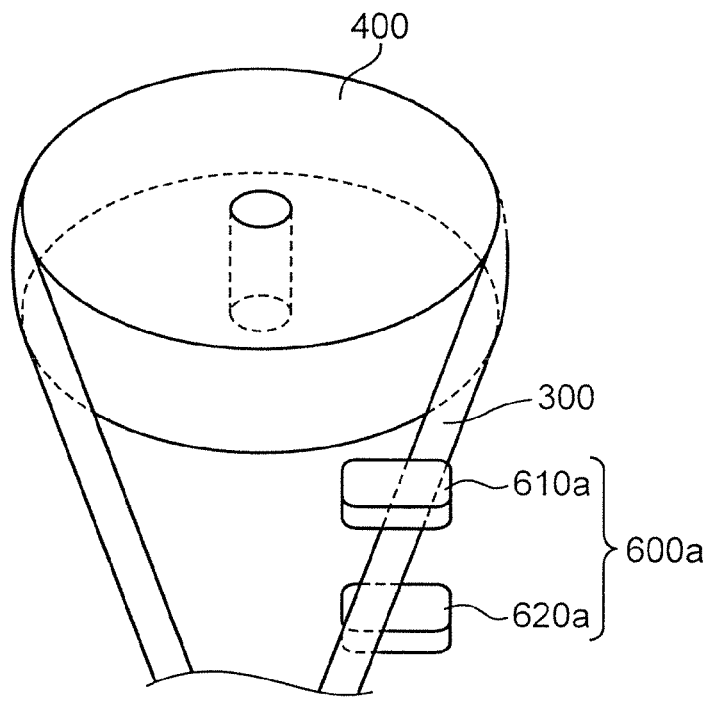
FIG. 8 is a schematic view illustrating an arrangement of a polisher according to a third embodiment.

FIG. 8 is a schematic view illustrating an arrangement of a polisher 600a according to the third embodiment. The polisher 600a includes a first polishing part 610a for polishing one of the opposite end edges of a metal belt 300, and a second polishing part 620a for polishing the other of the opposite edges. The polisher 600a is disposed on the opposite end edges of the metal belt 300 being straight between a driven pulley 400 and a motor drive shaft (unillustrated) (the polisher being disposed on the opposite end edges of a straight portion of the metal belt extending between the rotational members). The polisher 600a can be easily installed because between those rotational members, it is unlikely to interfere with other members (such as the driven pulley 400 and the motor drive shaft). Further, the driven pulley 400 and the motor drive shaft do not need to have a shape that avoids contact with the polisher 600a.

Specifically, in the present embodiment, the respective circumferences of the driven pulley 400 and the motor drive shaft do not need to have, for example, a crown shape as described in the first embodiment to thereby keep the opposite end edges of the metal belt 300 away from the driven pulley 400 (see FIG. 6). Therefore, in the present embodiment, the driven pulley 400 may have a general cylindrical shape. Consequently, it is possible to use a pulley in a general cylindrical shape as the driven pulley 400, which leads to reduction in manufacturing cost.

Further, because the metal belt 300 is straight between the driven pulley 400 and the motor drive shaft, it is possible to dispose the first polishing part 610a and the second polishing part 620a to make surface contact with the opposite end edges of the metal belt 300. This allows the first polishing part 610a and the second polishing part 620a to uniformly polish the opposite end edges of the metal belt 300 while making surface contact therewith. Therefore, even if cracks occur in the end edges of the metal belt 300, the cracks are satisfactorily removed.

Fourth Embodiment

A driving device according to a fourth embodiment is configured in the same manner as the driving device 200 of the first embodiment, except that a polisher is provided in a driven pulley. Accordingly, repeated description of sections and components that are identical to those of the first embodiment will be omitted as appropriate.

Figure 9:
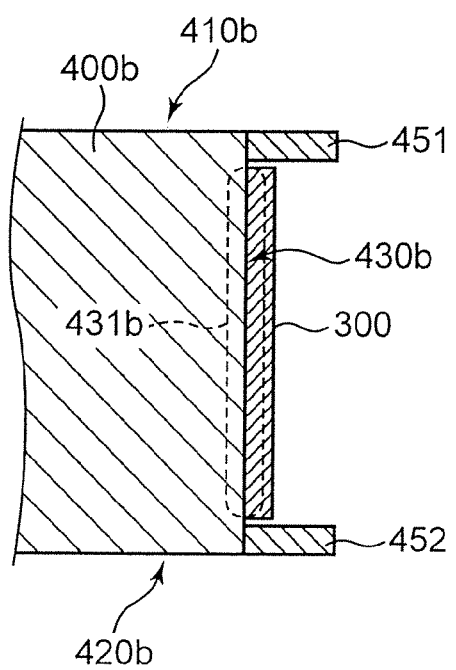
FIG. 9 is a diametrical sectional view of a driven pulley according to a fourth embodiment.

FIG. 9 is a diametrical sectional view of a driven pulley 400*b* according to the fourth embodiment. The driven pulley 400*b* includes flanges (an upper flange 451 and a lower flange 452) serving as a polisher. The upper flange 451 and the lower flange 452 are provided on the opposite end edges of a flat circumferential surface 430*b* of the driven pulley 400*b*. The upper flange 451 and the lower flange 452 protrude outward in relative to the circumferential surface 430*b* in a radial direction of the driven pulley 400*b* (the flanges being provided on the opposite end edges of the circumferential surface of the rotational member to protrude outward in relative to the circumferential surface in the radial direction of the rotational member).

The upper flange 451 and the lower flange 452 are made of a harder material than a metal belt 300 described above. The upper flange 451 and the lower flange 452 properly come in contact with the end edges of the metal belt 300 running around the driven pulley 400*b*, thereby polishing the opposite end edges of the metal belt 300 (the flanges coming in contact with the opposite end edges of a certain part of the metal belt to thereby polish the opposite edges, the certain part coming in contact with the rotational member).

Because the upper flange 451 and the lower flange 452 protrude radially outward in relative to the circumferential surface 430*b*, the metal belt 300 running around the driven pulley 400*b* is prevented from slipping off. A protrusion length of the upper flange 451 and the lower flange 452 is not limited to a particular value, but is preferable to be greater than the thickness of the metal belt 300 for the purpose of uniformly polishing the end edges of the metal belt 300. The metal belt 300 in running is prevented from slipping off from the driven pulley 400*b*, especially when the protrusion length is sufficient (e.g., when the protrusion length exceeds the thickness of the metal belt 300).

The way of forming the upper flange 451 and the lower flange 452 to the driven pulley 400*b* is not limited to a particular one. The upper flange 451 and the lower flange 452 may be integrally formed with the driven pulley 400*b* when the driven pulley 400*b* is manufactured, or may be integrated with the driven pulley 400*b* by welding or the like after they are separately manufactured. In the case where the driven pulley 400*b* and the upper and lower flanges 451 and 452 are integrally formed, the circumference of the driven pulley 400 is drilled in a radially inward direction to form the circumferential surface 430*b* so that the upper flange 451 and the lower flange 452 protrude radially outward in relative to the opposite end edges of the circumferential surface 430*b*.

In the present embodiment, the upper flange 451 and the lower flange 452 serving as the polisher are provided in the driven pulley 400*b*. This leads to reduction in the number of components of the driving device, which in turn leads to cost reduction and space saving, as compared to the case of providing a polisher separately from a driven pulley. Further, this prevents interference between components, which in turn prevents failure of the driving device, as compared to the case of providing a polisher between or around a driven pulley and a motor drive shaft.

Figure 10:
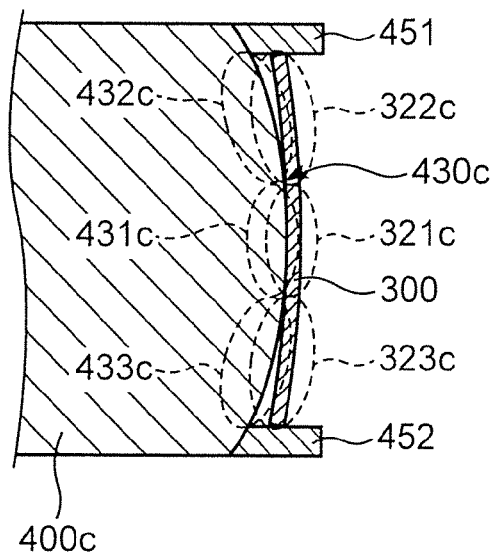
FIG. 10 is a schematic view showing another example of the driven pulley according to the fourth embodiment.

The driven pulley 400*b* of the present embodiment only requires that the upper flange 451 and the lower flange 452 be provided on the opposite end edges of the circumferential surface 430*b* and, therefore, the shape of the circumferential surface 430*b* is not limited to a particular one. FIG. 10 is a schematic view showing another exemplary driven pulley 400*b* (driven pulley 400*c*) according to the present embodiment. The driven pulley 400*c* has a circumferential surface 430*c* having a curved shape with a widthwise central region 431*c* projecting farthest in the radially outward direction. Specifically, the circumferential surface 430*c* of the driven pulley 400*c* has a bulge which gradually reduces from the central region 431*c* to the opposite end edges (an upper peripheral region 432*c* and a lower peripheral region 433*c*). An upper flange 451 and a lower flange 452 are provided on the widthwise outsides of the upper peripheral region 432*c* and the lower peripheral region 433*c* of the circumferential surface 430*c*, respectively.

The upper flange 451 and the lower flange 452 protrude radially outward in relative to the least projecting parts (a widthwise upper end of the upper peripheral region 432*c* and a widthwise lower end of the lower peripheral region 433*c*) of the circumferential surface 430*c* of the driven pulley 400*c*, the circumferential surface 430*c* bulging radially outward. A metal belt 300 which is wound on the driven pulley 400*c* having such shape comes in contact with the central region 431*c* of the driven pulley 400*c* at a central region 321*c* of the metal belt 300, but does not come in contact with the upper peripheral region 432*c* and the lower peripheral region 433*c* of the driven pulley 400 at an upper peripheral region 322*c* and a lower peripheral region 323*c* of the metal belt 300. This prevents a stress from the driven pulley 400*c* from being applied to the end edges of the metal belt 300, which makes the end edges unlikely to develop cracks. Even if cracks occur in the end edges of the metal belt 300, the cracks are polished and removed by the upper flange 451 and the lower flange 452.

Fifth Embodiment

A driving device according to a fifth embodiment is configured in the same manner as the driving device of the fourth embodiment, except that flanges serving as a polisher have a different configuration. Accordingly, repeated description of sections and components that are identical to those of the fourth embodiment will be omitted as appropriate.

Figure 11:
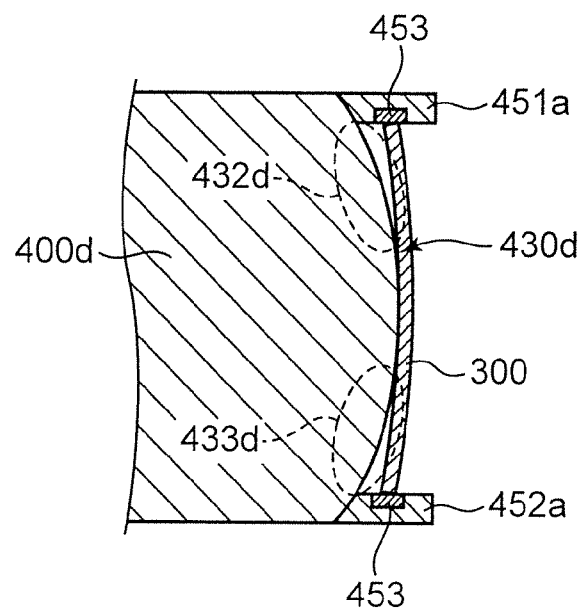
FIG. 11 is a diametrical sectional view of a driven pulley according to a fifth embodiment.

FIG. 11 is a diametrical sectional view of a driven pulley 400*d* according to the fifth embodiment. The driven pulley 400*d* includes flanges (an upper flange 451*a* and a lower flange 452*a*) serving as a polisher. The upper flange 451*a* and the lower flange 452*a* are provided on the opposite end edges of a circumferential surface 430*d* of the driven pulley 400*d*. The upper flange 451*a* and the lower flange 452*a* protrude radially outward in relative to the least projecting parts (a widthwise upper end of the upper peripheral region 432*d* and a widthwise lower end of the lower peripheral region 433*d*) of the circumferential surface 430*d* of the driven pulley 400*d*, the circumferential surface 430*d* bulging radially outward.

The upper flange 451*a* and the lower flange 452*a* are provided with polishing parts 453 on their respective side surfaces that come in contact with the end edges of a metal belt 300, the polishing parts 453 for polishing the end edges of the metal belt 300 (the polisher including the polishing parts which are made of a harder material than the metal belt, and provided at positions allowing contact with the end edges of the metal belt). In the present embodiment, the end edges of the metal belt 300 come in contact with the polishing parts 453 that are separately provided in the upper flange 451a and the lower flange 452a, thereby being polished.

The polishing parts 453 are not limited to a particular material, but preferably made of a harder material than the above-mentioned metal belt 300.

The way of forming the respective polishing parts 453 to the upper flange 451a and the lower flange 452a is not limited to a particular one. For example, a recessed groove may be formed in the side surface of each flange that faces the metal belt 300 to place a polishing part 453 in the recessed groove. Alternatively, a polishing part 453 having a sheet-like shape may be attached to the side surface of each flange that faces the metal belt 300. Further alternatively, a coating film of hard material may be formed on the side surface of each flange that faces the metal belt 300 to use the coating film as a polishing part 453.

As for the part other than the polishing part 453 of each of the upper flange 451a and the lower flange 452a serving as the polisher, the material is not limited to a particular one, but various materials may be used. Therefore, even in a case that the driving device is disposed in a relatively narrow space, for example, it is possible to use a material that can be easily worked (such as resin material) for the part other than the polishing part 453 of each of the upper flange 451 and the lower flange 452a in order to allow the flanges to fit in such narrow space. This allows the polisher to be worked in an optimal shape for various components of the image forming apparatus. Further, the driving device can reduce the mounting space.

Although the embodiments of the present disclosure have been described above, the present disclosure is not limited to the above embodiments and, for example, the following embodiments may be adopted.

(1) The above embodiments illustrate a driving device in which an endless metal belt is wound around a driven pulley and a motor drive shaft. Alternatively, a driving device may be used in a mechanism in which an endless metal belt is wound around a driven pulley and a driving pulley. In this case, it is possible to use as the driving pulley a pulley having a substantially cylindrical shape similar to that of the driven pulley, for example. Further, a polisher can also be disposed around the driving pulley, instead of the driven pulley.

(2) The above embodiment (first embodiment) illustrates a driven pulley which has a circumferential surface projecting radially outward into a curved shape. Alternatively, a driven pulley having a flat circumferential surface may be used. In this case, for example, the driven pulley is made to have a circumferential surface having a smaller width than an endless metal belt, so that the opposite end edges of the metal belt wound on the driven pulley protrude from the widthwise opposite ends of the driven pulley. This enables a polisher to easily polish the opposite end edges of the metal belt without interfering with the driven pulley. Further, even in a case where the metal belt has the same width as the driven pulley, the polisher can polish the opposite end edges of the metal belt without interfering with the driven pulley by processing chamfering to the ends of the flat circumferential surface of the driven pulley that join an upper surface and a lower surface of the driven pulley.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

What is claimed is:

1. A driving device, comprising:
an endless metal belt having a strip shape;
a plurality of rotational members for bearing the metal belt to allow the metal belt to run circularly; and
a polisher disposed so as to come in contact with widthwise opposite end edges of the metal belt for polishing the opposite end edges of the metal belt in running, the polisher having a shape that avoids interference with the rotational members, wherein:
at least a first of the plurality of rotational members has a pair of opposite surfaces, and a circumferential surface for bearing the metal belt thereon,
the circumferential surface has, in cross sectional view perpendicular to a circumferential direction of the metal belt, a convex shape projecting radially outward,
the circumferential surface has a widthwise central region coming in contact with the metal belt, and a widthwise peripheral region that is not in contact with the metal belt, and
the polisher is disposed near the first rotational member along the widthwise opposite end edges of the metal belt at a farther downstream position in a rotational direction of the first rotational member than a position where the metal belt starts changing from a straight form into a curved form by contacting the first rotational member.

2. A driving device according to claim 1, wherein
at least one of the plurality of rotational members has a pair of opposite surfaces, and a circumferential surface for bearing the metal belt thereon, and
the circumferential surface has
a widthwise central region coming in contact with the metal belt, and
a widthwise peripheral region having a beveled area having been processed by chamfering, the beveled area coming in non-contact with the metal belt.

3. A driving device according to claim 1, wherein
the polisher is disposed on the opposite end edges of a straight portion of the metal belt wound around the rotational members, the straight portion extending between the rotational members.

4. A driving device according to claim 1, wherein
at least one of the plurality of rotational members has a pair of opposite surfaces, and a circumferential surface for bearing the metal belt thereon,
the polisher includes flanges disposed on the opposite end edges of the circumferential surface, and
the flanges each protrude outward in a radial direction of the rotational member in relative to the circumferential surface, the flanges coming in contact with the opposite end edges of a certain part of the metal belt wound around the rotational members to thereby polish the opposite end edges, the certain part coming in contact with the rotational member.

5. A driving device according to claim 1, wherein
the polisher includes a polishing part having a material harder than the metal belt, the polishing part being disposed at a position allowing contact with the opposite end edges of the metal belt.

6. An image forming apparatus, comprising:
a driving device according to claim 1; and
an image former for forming an image on a sheet, the image former including a component that is rotationally driven by the driving device.

7. A driving device according to claim 1, wherein the width of the metal belt ranges from 5 to 10 mm, and the polisher is spaced apart from the widthwise opposite end edges of the metal belt by a separation distance ranging from 0.5 to 2 mm.

8. A driving device according to claim 1, wherein the width between the opposite surfaces is smaller than the width of the metal belt.

\* \* \* \* \*